United States Patent
Chen et al.

(10) Patent No.: US 10,382,958 B2
(45) Date of Patent: *Aug. 13, 2019

(54) METHODS AND DEVICES OF REGISTERING, VERIFYING IDENTITY OF, AND INVALIDATING NON-SIM MOBILE TERMINALS ACCESSING A WIRELESS COMMUNICATION NETWORK

(71) Applicant: Telefonaktiebolaget LM Ericsson (publ), Stockholm (SE)

(72) Inventors: Ping Chen, Shanghai (CN); Ruiyu Chen, Shanghai (CN); Cheng Wang, Shanghai (CN); Yiming Wu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 26 days.

This patent is subject to a terminal disclaimer.

(21) Appl. No.: 15/747,877

(22) PCT Filed: Jul. 31, 2015

(86) PCT No.: PCT/CN2015/085782
§ 371 (c)(1),
(2) Date: Jan. 26, 2018

(87) PCT Pub. No.: WO2017/020195
PCT Pub. Date: Feb. 9, 2017

(65) Prior Publication Data
US 2018/0227757 A1 Aug. 9, 2018

(51) Int. Cl.
*H04W 12/06* (2009.01)
*H04W 60/00* (2009.01)
(Continued)

(52) U.S. Cl.
CPC ......... *H04W 12/06* (2013.01); *H04L 63/0823* (2013.01); *H04W 12/0023* (2019.01);
(Continued)

(58) Field of Classification Search
CPC ..... H04W 12/06; H04W 12/08; H04W 12/04; H04L 63/0823; H04L 63/0892; H04L 63/0876; H04L 63/101; G06F 21/73
See application file for complete search history.

(56) References Cited

U.S. PATENT DOCUMENTS

2009/0300168 A1* 12/2009 Guo .................. G06F 21/73
709/224
2009/0300744 A1  12/2009 Guo et al.
(Continued)

FOREIGN PATENT DOCUMENTS

CN   103124440 A   5/2013
CN   103841560 A   6/2014
(Continued)

OTHER PUBLICATIONS

International Search Report and Written Opinion of the International Searching Authority, PCT/CN2015/085782, dated Apr. 29, 2016, 7 pages.
(Continued)

Primary Examiner — George Eng
Assistant Examiner — Umair Ahsan
(74) Attorney, Agent, or Firm — Sage Patent Group (57) ABSTRACT

In a first aspect of the disclosure, a method performed by an Application Server (AS) of registering a non-Subscriber Identity Module (SIM) mobile terminal with a wireless network is provided. The method comprises receiving a request for registration of the non-SIM mobile terminal, the non-SIM mobile terminal being associated with a trusted SIM mobile terminal by means of an identifier of the
(Continued)

non-SIM mobile terminal, issuing a virtual International Mobile Station Equipment Identity (vIMEI) for the non-SIM mobile terminal, providing an Equipment Identity Register (EIR), with the vIMEI, providing a certificate issuing entity in the network with the vIMEI, receiving, from the certificate issuing entity, a certificate issued based on the vIMEI, and providing the non-SIM mobile terminal with the issued certificate.

12 Claims, 7 Drawing Sheets

(51) Int. Cl.
*H04W 12/00* (2009.01)
*H04L 29/06* (2006.01)
(52) U.S. Cl.
CPC . *H04W 12/00401* (2019.01); *H04W 12/0609* (2019.01); *H04W 60/00* (2013.01)

(56) References Cited

U.S. PATENT DOCUMENTS

| | | | | |
|---|---|---|---|---|
| 2013/0268756 | A1* | 10/2013 | Davis | G06F 21/6218 713/165 |
| 2014/0086177 | A1* | 3/2014 | Adjakple | H04W 12/08 370/329 |
| 2015/0172315 | A1* | 6/2015 | Hirst | H04L 63/0861 726/5 |
| 2015/0327073 | A1* | 11/2015 | Rommer | H04L 63/0876 455/410 |
| 2016/0112410 | A1* | 4/2016 | Nedeltchev | H04L 63/0823 713/156 |
| 2016/0261596 | A1* | 9/2016 | Khello | H04W 12/08 |

FOREIGN PATENT DOCUMENTS

| | | |
|---|---|---|
| CN | 104378729 A | 2/2015 |
| EP | 3 132 628 A1 | 2/2017 |
| WO | WO 2010/013914 A2 | 2/2010 |
| WO | WO 2011/032605 A1 | 3/2011 |

OTHER PUBLICATIONS

"Technical Specification Group Core Network and Terminals; Evolved Packet System (EPS); Mobility Management Entity (MME) and Serving GPRS Support Node (SGSN) related Interfaces based on Diameter Protocol (Release 13)" 3GPP TS 29.272, V13.1.0 (Mar. 2015) 136 pages.

"Technical Specification Group Services and System Aspects; International Mobile Station Equipment Identities (IMEI) (Release 12)" 3GPP TS 22.016, V12.0.0 (Oct. 2014) 8 pages.

"Technical Specification Group Services and System Aspects; Architecture Enhancements for Non-3GPP Accesses (Release 12)" 3GPP TS 23.402, V12.8.0 (Mar. 2015) 290 pages.

"Technical Specification Group Services and System Aspects; 3GPP System to Wireless Local Area Network (WLAN) Interworking; System Description (Release 12)" 3GPP TS 23.234, V12.0.0 (Sep. 2014) 84 pages.

"Technical Specification Group Core Network and Terminals; Sh Interface Based on the Diameter Protocol; Protocol Details (Release 12)" 3GPP TS 29.329, V12.5.0 (Dec. 2014) 23 pages.

"Technical Specification Group Services and System Aspects; 3GPP System Architecture Evolution (SAE); Security Aspects of Non-3GPP Accesses (Release 12)" 3GPP TS 33.402, V12.5.0 (Dec. 2014) 56 pages.

Extended European Search Report for European Patent Application No. 15899971.4 dated Jun. 3, 2019, 12 pages.

* cited by examiner

Fig. 9

METHODS AND DEVICES OF REGISTERING, VERIFYING IDENTITY OF, AND INVALIDATING NON-SIM MOBILE TERMINALS ACCESSING A WIRELESS COMMUNICATION NETWORK

CROSS REFERENCE TO RELATED APPLICATIONS

This application is a 35 U.S.C. § 371 national stage application of PCT International Application No. PCT/CN2015/085782 filed on Jul. 31, 2015, the disclosure and content of which is incorporated by reference herein in its entirety.

TECHNICAL FIELD

The disclosure relates to methods and devices of registering, verifying identity of, and invalidating non-SIM mobile terminals accessing a wireless communication network. The disclosure further relates to computer programs for causing the devices to perform the methods according to the disclosure, and corresponding computer program products.

BACKGROUND

For small cell applications in mobile broadband heterogeneous networks, WiFi—i.e. access via Wireless Local Area Networks (WLANs)—is today considered a key solution. There is currently an intense activity on a global basis on how to integrate WiFi with 3rd Generation Partnership Project (3GPP) communication networks in order to offer, in a similar fashion as any 3GPP radio access technology, WiFi integrated with the 3GPP Evolved Packet Core (EPC), i.e. the core network in the Long-Term Evolution (LTE) standard, where the access authentication and authorization is controlled through the network.

Prior art methods exist where the EPC network can be accessed via WiFi, where the WiFi access is authenticated using Subscriber Identity Module (SIM) based authentication methods utilizing for instance Extensible Authentication Protocol (EAP) methods, such as EAP-SIM, EAP-AKA ("Authentication and Key Agreement") or EAP-AKA', towards the same network entities as are used for 3GPP. For non-SIM Devices such as tablets or laptops, solutions exist where the devices are authenticated through non-SIM based authentication methods, e.g. the well-known EAP-TLS ("Transport Layer Security").

Currently, for 2G/3G/4G access, Mobile Equipment Identity check procedures between a Mobility Management Entity (MME) or a Serving General Packet Radio Service (GPRS) Support Node (SGSN) and a so called Equipment Identity Register (EIR) has been specified. However, there is not yet a solution for non-SIM device identity check when it connects to operator core network via WiFi. As such, operators are not able to control the WiFI access of a non-SIM device when the device is faulty or blacklisted, which is a security risk.

SUMMARY

An object of the present disclosure is to solve, or at least mitigate, this problem in the art and to provide an improved method of verifying identity of non-SIM devices in a wireless network.

This object is attained in a first aspect of the disclosure by a method performed by an Application Server (AS) of registering a non-SIM mobile terminal with a wireless network. The method comprises receiving a request for registration of the non-SIM mobile terminal, the non-SIM mobile terminal being associated with a trusted SIM mobile terminal by means of an identifier of the non-SIM mobile terminal, issuing a virtual International Mobile Station Equipment Identity (vIMEI) for the non-SIM mobile terminal, providing an EIR with the vIMEI, and providing a certificate issuing entity in the network with the vIMEI. The method further comprises receiving, from the certificate issuing entity, a certificate issued based on the vIMEI, and providing the non-SIM mobile terminal with the issued certificate.

This object is attained in a second aspect of the disclosure by an AS configured to register a non-SIM mobile terminal with a wireless network—The AS comprises a processing unit and a memory, which memory contains instructions executable by the processing unit, whereby the AS is operative to receive a request for registration of the non-SIM mobile terminal, the non-SIM mobile terminal being associated with a trusted SIM mobile terminal by means of an identifier of the non-SIM mobile terminal, issue a vIMEI for the non-SIM mobile terminal, provide an EIR with the vIMEI, and provide a certificate issuing entity in the network with the vIMEI. The AS is further operative to receive, from the certificate issuing entity, a certificate issued based on the vIMEI, and provide the non-SIM mobile terminal with the issued certificate.

By associating the non-SIM mobile terminal with a trusted SIM mobile terminal, the non-SIM mobile terminal can be safely registered with the network by the AS and a vIMEI is issued on the basis of which the identity of the non-SIM mobile terminal subsequently may be verified in the network. Hence, a subsequent identity check of the non-SIM mobile terminal is advantageously facilitated.

The object is attained in a third aspect of the disclosure by a method performed by an Authentication, Authorization and Accounting (AAA) server of verifying identity of a non-SIM mobile terminal in a wireless network. The method comprises receiving a request for service of the non-SIM mobile terminal, acquiring a certificate of the non-SIM mobile terminal, verifying that a vIMEI included in the certificate is registered with an EIR, wherein the identity of the non-SIM mobile terminal is considered verified.

The object is attained in a fourth aspect of the disclosure by an AAA server configured to verify identity of a non-SIM mobile terminal with a wireless network. The AAA server comprises a processing unit and a memory, the memory containing instructions executable by the processing unit, whereby the AAA server is operative to receive a request for service of the non-SIM mobile terminal, acquire a certificate of the non-SIM mobile terminal, verify that a vIMEI included in the certificate is registered with an EIR, wherein the identity of the non-SIM mobile terminal is considered verified.

The identity of the non-SIM mobile terminal may have been verified in the network by the AAA server based on the vIMEI that previously was securely issued for the non-SIM mobile terminal by the AS on the basis of the association with a trusted mobile terminal, be it a trusted SIM mobile terminal or a trusted non-SIM mobile terminal.

The object is further attained in a fifth aspect of the disclosure by a method performed by an AS of invalidating a non-SIM mobile terminal registered with a wireless network. The method comprises receiving a request of a trusted mobile terminal to invalidate a registration of a non-SIM mobile terminal being associated with the trusted mobile terminal by means of an identifier of the non-SIM mobile terminal to be invalidated, determining whether the association between the trusted mobile terminal and the non-SIM mobile terminal to be invalidated previously has been registered with the network, instructing EIR that a vIMEI registered for the non-SIM mobile terminal in the network should be invalidated, and sending a response to the trusted mobile terminal that the registration of the non-SIM mobile terminal with the network has been invalidated.

The object is further attained in a sixth aspect of the disclosure by an AS configured to invalidate a non-SIM mobile terminal registered with a wireless network. The AS comprises a processing unit and a memory, the memory containing instructions executable by the processing unit, whereby the AS is operative to receive a request of a trusted mobile terminal to invalidate a registration of a non-SIM mobile terminal being associated with the trusted mobile terminal by means of an identifier of the non-SIM mobile terminal to be invalidated, determine whether the association between the trusted mobile terminal and the non-SIM mobile terminal to be invalidated previously has been registered with the network, instruct an EIR that a vIMEI registered for the non-SIM mobile terminal in the network should be invalidated, and send a response to the trusted mobile terminal that the registration of the non-SIM mobile terminal with the network has been invalidated.

By invalidating the vIMEI, typically by indicating the vIMEI to be blacklisted in the EIR, for instance due to theft of the non-SIM mobile terminal, the non-SIM mobile terminal may no longer be considered trusted, and its identity cannot be verified in the network until registered again by a trusted mobile terminal, either a trusted SIM mobile terminal or a trusted non-SIM mobile terminal.

The disclosure further relates to computer programs for causing the devices to perform the methods according to the disclosure, and corresponding computer program products.

Embodiments of the disclosure will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The disclosure is now described, by way of example, with reference to the accompanying drawings, in which.

DETAILED DESCRIPTION

The disclosure will now be described more fully hereinafter with reference to the accompanying drawings, in which certain embodiments are shown. This disclosure may, however, be embodied in many different forms and should not be construed as limited to the embodiments set forth herein; rather, these embodiments are provided by way of example so that this disclosure will be thorough and complete, and will fully convey the scope to those skilled in the art. Like numbers refer to like elements throughout the description.

Figure 1:
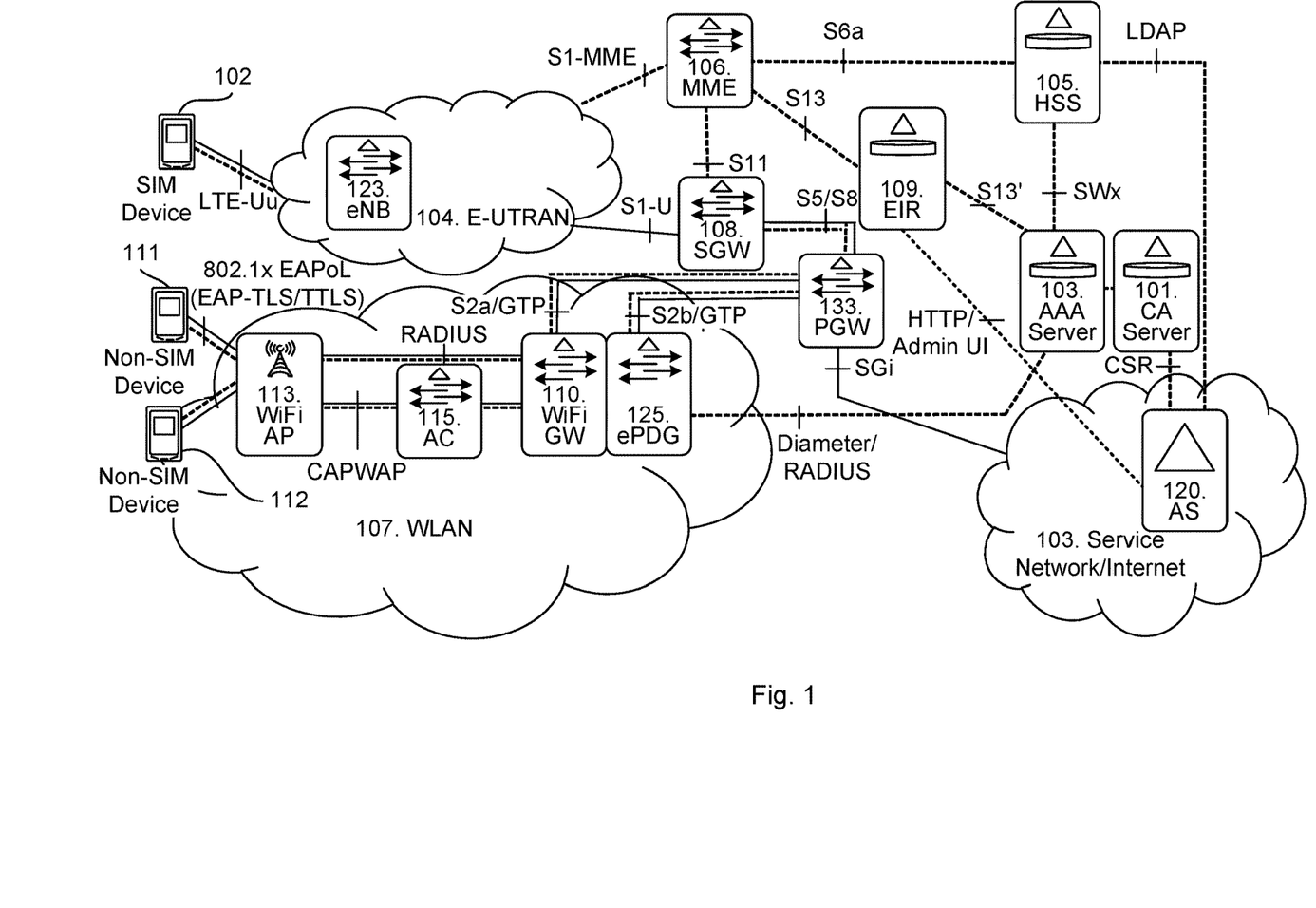
FIG. 1 shows a schematic overview of an exemplifying wireless communication network in which the present disclosure can be implemented.

FIG. 1 shows a schematic overview of an exemplifying wireless communication network 100 in which the present disclosure can be implemented. The wireless communication network 100 is an LTE based network. It should be pointed out that the terms "LTE" and "LTE based" network is here used to comprise both present and future LTE based networks, such as, for example, advanced LTE networks. It should be appreciated that although FIG. 1 shows a wireless communication network 100 in the form of an LTE based network, the example embodiments herein may also be utilized in connection with other wireless communication networks, such as e.g. Global System for Mobile Communications (GSM) or Universal Mobile Telecommunication System (UMTS) networks, comprising nodes and functions that correspond to the nodes and functions of the network in FIG. 1. It should be noted that the network in FIG. 1 is simplified; in practice, an LTE network comprises further functional entities than those illustrated with reference to FIG. 1. In FIG. 1, user plane data connections are indicated by means of continuous lines while control plane data connections are indicated by means of dashed lines.

The wireless communication network 100 comprises one or more base stations in the form of an eNodeB 123, operatively connected to a Serving Gateway 108 (SGW), in turn operatively connected to a Mobility Management Entity 106 (MME) and a Packet Data Network Gateway 133 (PGW). The eNodeB 123 is a radio access node that interfaces with a first mobile radio terminal 102, e.g. a UE, equipped with a SIM card.

The eNodeB 123 of the network forms the radio access network called Evolved Universal Terrestrial Radio Access Network (E-UTRAN) 104 for LTE communicating with the first UE 102 over an air interface such as LTE-Uu. The core network in LTE is known as Evolved Packet Core (EPC), and the EPC together with the E-UTRAN is referred to as Evolved Packet System (EPS). The SGW 108 routes and forwards user data packets over the S1-U interface, whilst also acting as the mobility anchor for the user plane during inter-eNodeB handovers and as the anchor for mobility between LTE and other 3rd Generation Partnership Project (3GPP) technologies. For idle state UEs, the SGW 108 terminates the downlink data path and triggers paging when downlink data arrives for the first UE 102, and further manages and stores UE contexts, e.g. parameters of the IP bearer service, network internal routing information. It also performs replication of the user traffic in case of lawful interception. The SGW 108 communicates with the MME 106 via interface S11 and with the PGW 133 via the S5/S8 interface. Further, even though not shown in FIG. 1, the SGW 108 may communicate with UMTS radio access network UTRAN and with GSM EDGE ("Enhanced Data rates for GSM Evolution") Radio Access Network (GERAN) via an S12 interface.

The MME 106 is responsible for idle mode UE tracking and paging procedure including retransmissions. It is involved in the bearer activation/deactivation process and is also responsible for choosing the SGW 108 for a UE at the initial attach and at time of intra-LTE handover involving core network node relocation. It is responsible for authenticating the user by interacting with the Home Subscriber Server 105 (HSS). The Non-Access Stratum (NAS) signaling terminates at the MME 106 and it is also responsible for generation and allocation of temporary identities to UEs via the S1-MME interface. It checks the authorization of the first UE 102 to camp on the service provider's Public Land Mobile Network (PLMN) and enforces UE roaming restrictions. The MME 106 is the termination point in the network for ciphering/integrity protection for NAS signaling and handles the security key management. Lawful interception of signaling is also supported by the MME 106. The MME 106 also terminates the S6a interface towards the home HSS 105 for roaming UEs.

The PGW 133 provides connectivity for UEs to external packet data networks (PDNs) by being the point of exit and entry of traffic for UEs. A UE may have simultaneous connectivity with more than one PGW for accessing multiple PDNs. The PGW 133 performs policy enforcement, packet filtering for each user, charging support, lawful Interception and packet screening. Another key role of the PGW 133 is to act as the anchor for mobility between 3GPP and non-3GPP technologies such as WiMAX and 3GPP2 (CDMA 1x and EvDO). The interface between the PGW 133 and the packet data network 130, being for instance the Internet, is referred to as the SGi. The packet data network may be an operator external public or private packet data network or an intra operator packet data network, e.g. for provision of IP Multimedia Subsystem (IMS) services. The HSS 105 connects to an Application Server (AS) 120 in the PDN 130 via a Lightweight Directory Access Protocol (LDAP) interface Illustrated in FIG. 1 is also a RAN 107 in the form of a trusted/untrusted Wireless Local Area Network 107 (WLAN) via which a non-SIM mobile terminal 111, such as a tablet, may connect to the EPC. The non-SIM mobile terminal 111 will in the following be referred to as "the second UE". The second UE 111 connects to the WLAN 107 via interface 802.1x EAPoL (EAP-TLS/TTLS) to WiFi Access Point (AP) 113, as does non-SIM mobile terminal 112 referred to as "the third UE".

The trusted/untrusted WLAN 107 connects to the EPC via an Access Controller (AC) 116 and a WiFi Gateway (GW) no over interface S2a/GTP to the PGW 133 in case of trusted access, and via an Evolved Packet Data Gateway (ePDG) 125 over interface S2b/GTP in case of untrusted access. The AC 116 connects to the WiFi AP 113 via the interface denoted Control And Provisioning of Wireless Access Points (CAPWAP), while the WiFi GW 110 connects to the WiFi AP 113 via the interface RADIUS.

The network further comprises a 3GPP Authentication, Authorization and Accounting (AAA) server 103, which takes care of the authentication, authorization and accounting of UEs connecting to the EPC network via (untrusted) WLAN 107 and the ePDG 125 across interface Diameter/RADIUS. The 3GPP AAA server 103 also connects to the HSS 105 via interface SWx, and to a Certificate Authority (CA) server 101 for issuing certificates. The CA server 101 connects to the AS 120 in the PDN via interface CSR.

Finally, the network comprises an Equipment Identity Register (EIR) 109 containing a record of the all the UEs that are allowed in the network as well as all UEs that are blacklisted (e.g. because of theft or loss). The EIR 109 connects to the MME 106 via interface S13, and may be made to connect to the AAA server 103 via an interface S13', and to the AS 120 via a Hypertext Transfer Protocol (HTTP)/Admin User Interface (UI).

Figure 2:
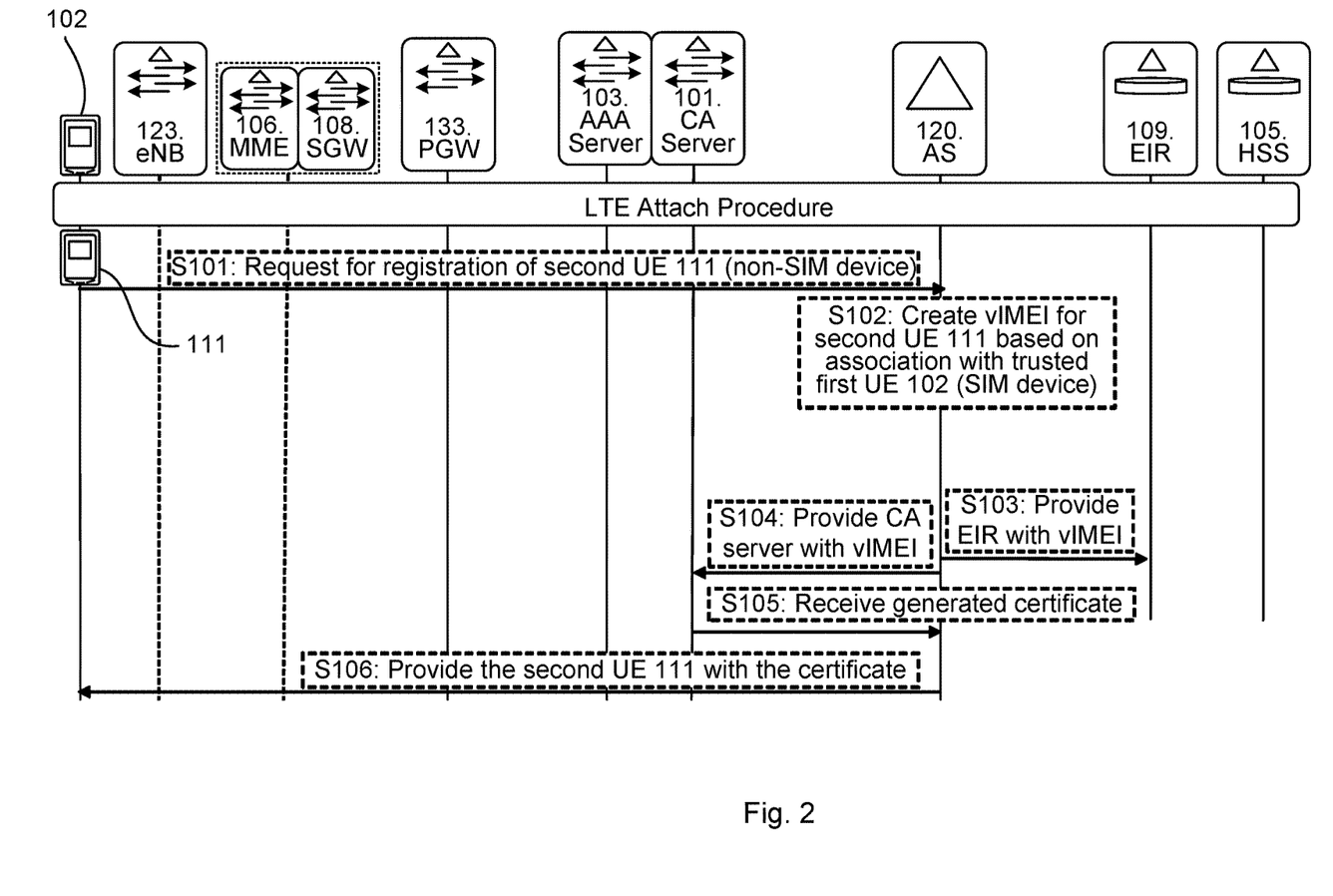
FIG. 2 shows a timing diagram illustrating an embodiment performed by the AS of registering a non-SIM mobile terminal with the wireless network.

FIG. 2 shows a timing diagram illustrating an embodiment performed by the AS 120 of registering a non-SIM mobile terminal, exemplified by the second UE 111 with the wireless network 100. Initially, an LTE Attach procedure is undertaken in the network 100 to connect the SIM mobile terminal 102, i.e. the first UE 102, to the network 100 via the E-UTRAN 104. This is a procedure well-known in the art, and is described in great detail in for instance technical specification 3GPP TS 23.401.

After having attached to the network 100, the first UE 102 will register an association with one or more non-SIM mobile terminals at the AS 120 using for instance a media access control (MAC) address of the non-SIM mobile terminal or its iOS Unique Device Identifier (UDID). A particular non-SIM mobile terminal may further be associated with a plurality of trusted SIM mobile terminals, and even a plurality of trusted non-SIM mobile terminals as will be discussed in the following.

Thus, in order to register the second UE 111 with the network 100 according to an embodiment, the AS 120 receives from the second UE 111 a request for registration of the second UE 111 in step S101, the second UE 111 being associated with the trusted first UE 102 by means of a unique identifier as just mentioned. To this end, the second UE 111 may log on to the AS 120 via the WLAN 107 or other IP connection using e.g. a designated app, a web portal, etc.

Thereafter, in step S102, the AS 120 issues a virtual International Mobile Station Equipment Identity (vIMEI) for the second UE 111 based on its association with the trusted first UE 102. In step S103, the issued vIMEI for the second UE 111 is provided to the EIR 109. Further, in step S104, the issued vIMEI for the second UE 111 is provided to the CA server 101 (optionally along with user profile data and related data such as a UDID). In response thereto, the AS 120 receives in step S105, from the CA server 101, a certificate issued based on the vIMEI.

Finally, in step S106, the AS 120 provides the second UE 111 with the issued certificate. The non-SIM mobile terminal embodied by the second UE 111 may have been safely registered with the network 100 by the AS 120, and a vIMEI has been issued on the basis of which the identity of the second UE 111 subsequently may be verified in the network. The second UE 111 is hence considered to be trusted.

Again with reference to FIG. 2, step S103 may in an embodiment comprise verifying that the vIMEI has not previously been registered with the EIR 109 or that the vIMEI has not been registered as blacklisted. If so, the created vIMEI is submitted by the AS 120 to the EIR 109. If not, the vIMEI is not registered with the EIR 109.

In a further embodiment, once the second UE 111 has been registered by the first UE 102, the second UE 111 is itself considered trusted and is thus authorized to register a further non-SIM mobile terminal, i.e. the third UE 112, with the network 100. Similar to the embodiment described with reference to FIG. 2, the trusted second UE 111 registers an association with the third UE 112 at the AS 120. Thereafter, the AS 120 receives a request for registration of a the third UE 112, and since the third UE 112 is associated with the (now) trusted second UE 111, a vIMEI is issued for the third UE 112, which vIMEI is provided to the EIR 109 and the CA server 101. The AS 120 receives a certificate for the third UE 112, and provides the third UE 112 with the issued certificate. As the third UE 112 now is trusted, it may itself be used to register further non-SIM mobile terminals with the network 100.

Figure 3:
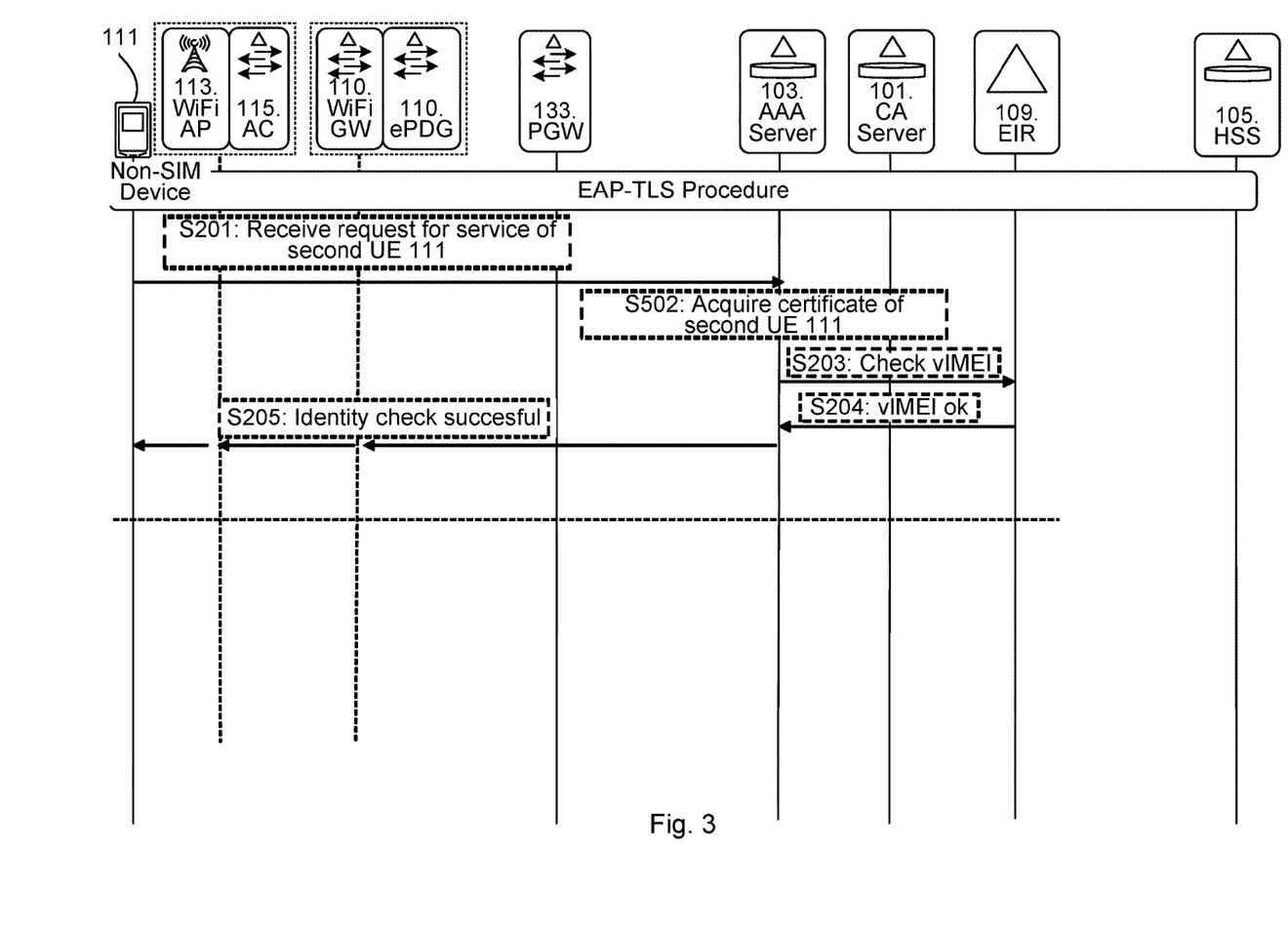
FIG. 3 shows a timing diagram illustrating a further embodiment performed by the AAA server of verifying identity of a non-SIM mobile terminal in the wireless network.

FIG. 3 shows a timing diagram illustrating a further embodiment performed by the AAA server 103 of verifying identity a non-SIM mobile terminal embodied by the second UE 111 in the wireless network 100, the second UE 111 accessing the wireless network 100 via the WLAN 107. Initially, an EAP-TLS procedure may be undertaken in the network 100 to authenticate the second UE 111 with the network 100 via the WLAN 107. This is a procedure well-known in the art, and is described in great detail in for instance RFC 5216.

Thus, in a first step S201, the AAA server 103 receives a request for service of the second UE 111 via WLAN access. It should be noted that the request may be a part of the EAP-TLS procedure. In step S202, the AAA server 103 acquires a certificate of the second UE 111, which certificate comprises the issued vIMEI as previously discussed with reference to FIG. 2. In an embodiment, the second UE 111 in fact submits the certificate with the request in step S201.

Thereafter, in steps S203 and S204, the AAA server 103 verifies that the vIMEI included in the certificate is registered with the EIR 109, wherein the identity of the second UE 111 is considered verified. Optionally, the second UE 111 may be informed of the successful identity check in step S205 by receiving an identity check success message from the AAA server 103. Conversely, in case the vIMEI is not registered with the EIR 109, or indicated to be blacklisted, the AAA server 103 may in step S205 instead send an identity check failure message. The AAA server 103 may in step S203, in addition to providing the vIMEI, optionally provide the EIR 109 with International Mobile Subscriber Identity (IMSI) of the second UE 111.

The identity of the non-SIM mobile terminal embodied by the second UE 111 may have been verified in the network 100 by the AAA server 103 based on the vIMEI previously issued for the second UE 111 by the AS 120.

Figure 4:
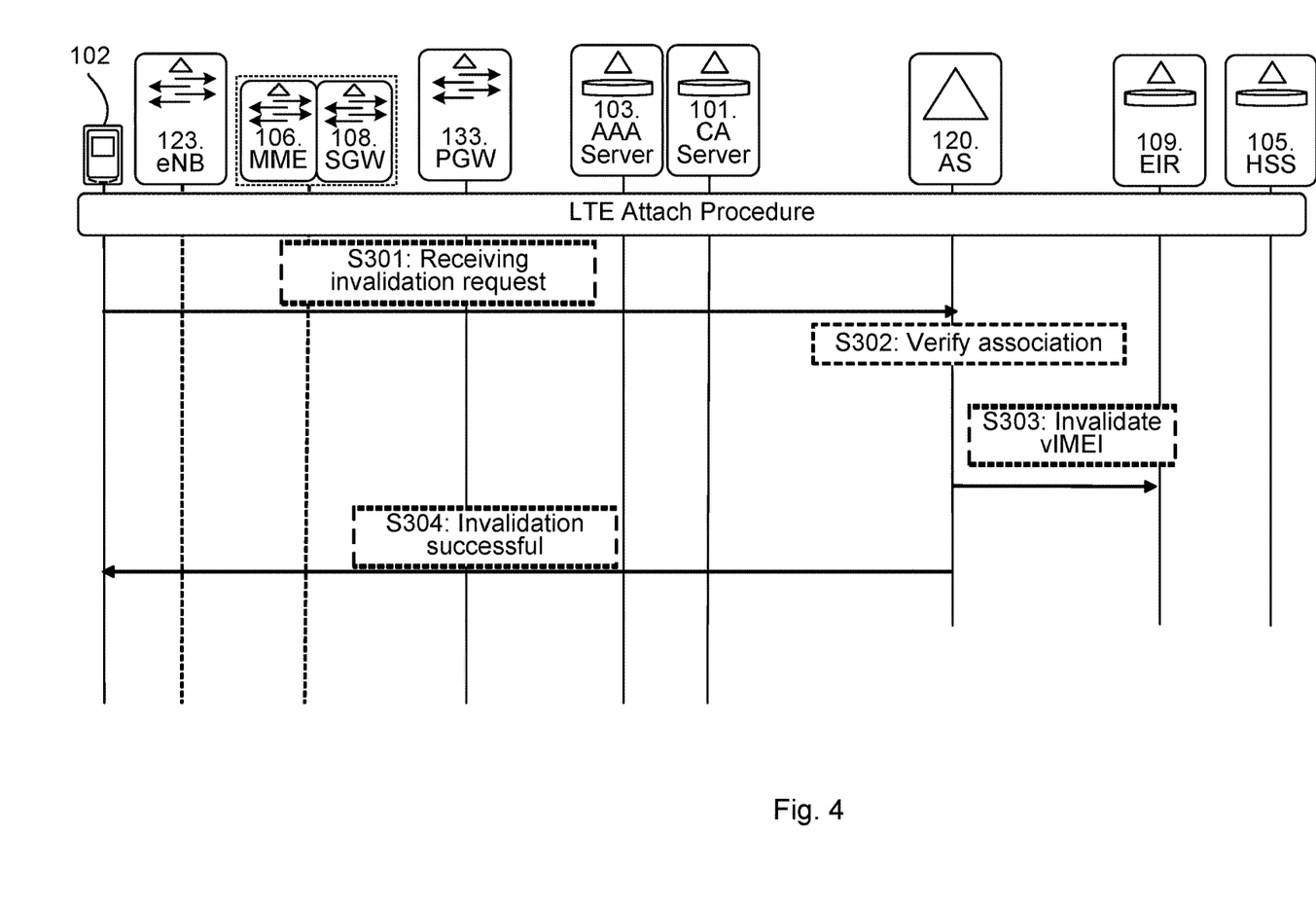
FIG. 4 shows a timing diagram illustrating yet a further embodiment performed by the AS of invalidating a non-SIM mobile terminal registered with the wireless network.

FIG. 4 shows a timing diagram illustrating yet a further embodiment performed by the AS 120 of invalidating a non-SIM mobile terminal (embodied by the second UE 111) registered with the wireless network 100, for instance as a result of theft of the second UE 111. In this particular embodiment, the invalidation is requested by the trusted first UE 102. As in the embodiment discussed with reference to FIG. 2, an LTE Attach procedure may initially be undertaken to connect the first UE 102 to the network 100 via the E-UTRAN 104.

In step S301, the AS 120 receives a request of the trusted first UE 102 to invalidate the registration of the second UE 111 being associated with the first UE 102 by means of an identifier of the second UE 111 which is to be invalidated (e.g. MAC address or UDID). The first UE 102 may for instance log on to the AS 120 using e.g. a designated app.

Thereafter, the AS 120 determines in step S302 whether the association between the first UE 102 and the second UE 111 previously has been registered with the network 100 (for instance, in step S103 of FIG. 2, the AS 120 may store the association between the first UE 102 and the second UE 111 along with the identifier in the form of e.g. MAC address or UDID). If so, the AS 120 instructs the EIR 109 in step S303 that the vIMEI, registered for the second UE 111 should be invalidated. Finally, in step S304, the AS 120 sends a response to the first UE 102 that the registration of the second UE 111 with the network has been invalidated. The second UE 111 may no longer be considered trusted, and its identity cannot be verified in the network 100 until registered again by a trusted mobile terminal. It should be noted that the invalidation of a vIMEI typically implies that the vIMEI is put on a blacklist.

Figure 5:
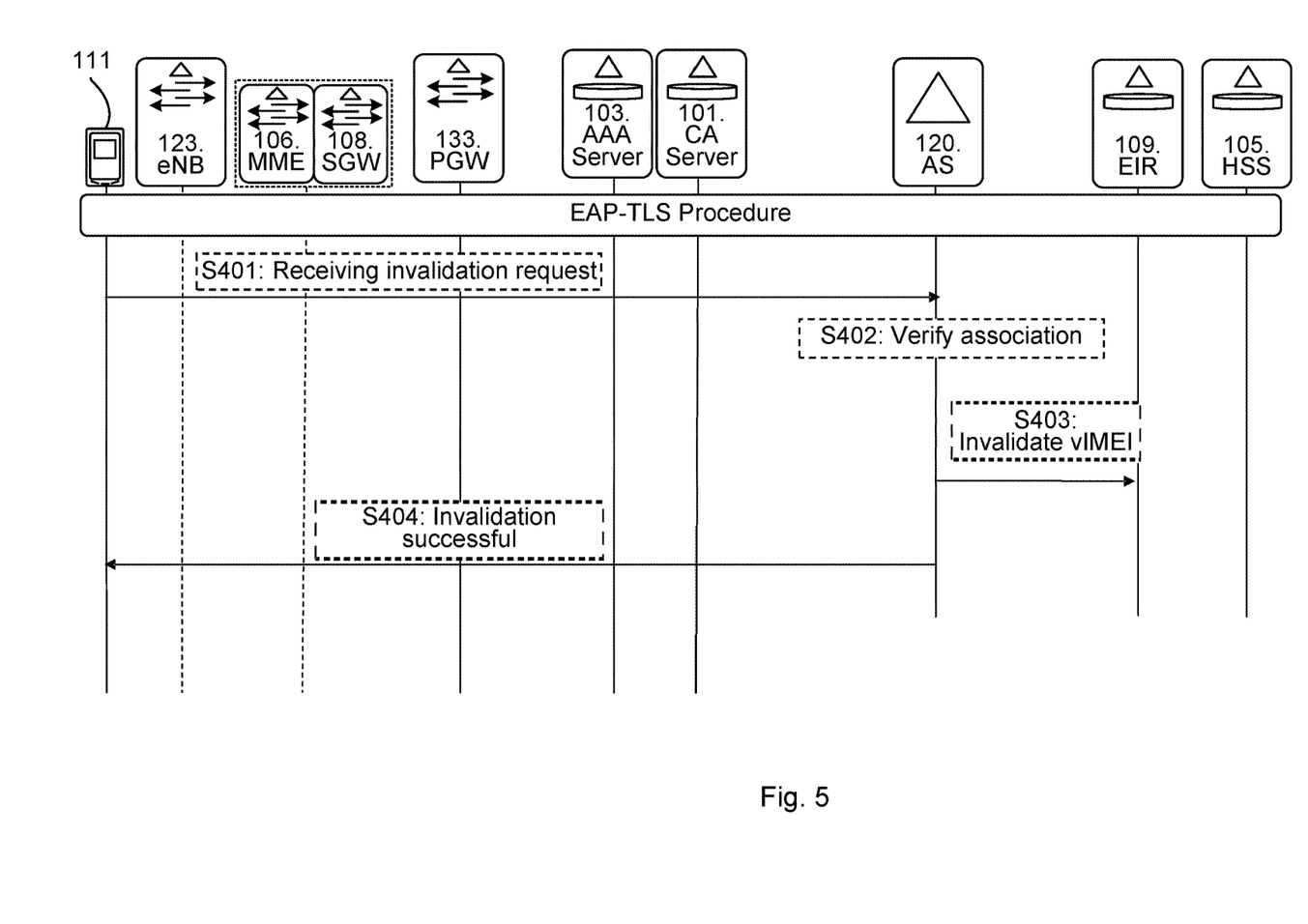
FIG. 5 shows a timing diagram illustrating still a further embodiment performed by the AS of invalidating a non-SIM mobile terminal registered with the wireless network.

FIG. 5 shows a timing diagram illustrating still a further embodiment performed by the AS 120 of invalidating a non-SIM mobile terminal (embodied by the third UE 112) registered with the wireless network 100, for instance as a result of theft of the third UE 112. In this particular embodiment, as was discussed with reference to FIG. 2, if the trusted second UE 111 (after having been registered by the first UE 102) was utilized to register the third UE 112, the invalidation may also requested by the trusted second UE 111. As in the embodiment discussed with reference to FIG. 3, an EAP-TLS procedure may be undertaken in the network 100 to connect and authenticate the second UE 111 with the network.

Thus, in step S401, the AS 120 receives a request of the trusted second UE 111 to invalidate the registration of the third UE 112 being associated with the second UE 111 by means of an identifier of the third UE 112 which is to be invalidated (e.g. MAC address or UDID). The second UE 111 may for instance log on to the AS 120 using e.g. a designated app.

Thereafter, the AS 120 determines in step S402 whether the association between the trusted second UE 111 and the third UE 112 previously has been registered with the network 100 (for instance, the AS 120 may be stored the association between the trusted second UE 111 and the third UE 112 upon registration of the third UE 112). If so, the AS 120 instructs the EIR 109 in step S403 that the vIMEI, registered for the third UE 112 should be invalidated. Finally, in step S404, the AS 120 sends a response to the second UE 111 that the registration of the third UE 112 with the network has been invalidated. The third UE 112 may no longer be considered trusted, and its identity cannot be verified in the network 100 until registered again by a trusted mobile terminal.

Figure 6:
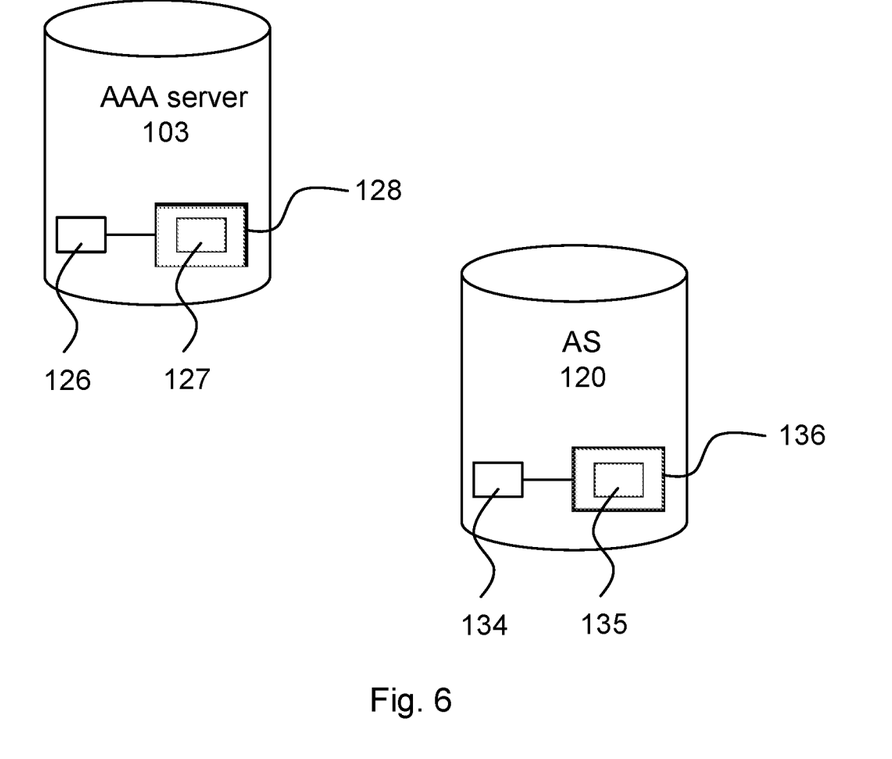
FIG. 6 illustrates an AAA server and an AS according to an embodiment.

With reference to FIG. 6, the steps of the method performed by the AAA server 103 according to embodiments are in practice caused by a processing unit 126 embodied in the form of one or more microprocessors arranged to execute a computer program 127 downloaded to a suitable storage medium 128 associated with the microprocessor, such as a Random Access Memory (RAM), a Flash memory or a hard disk drive. Similarly, the steps of the method performed by the AS 120 according to embodiments are in practice caused by a processing unit 134 embodied in the form of one or more microprocessors arranged to execute a computer program 135 downloaded to a suitable storage medium 136 associated with the microprocessor, such as a Random Access Memory (RAM), a Flash memory or a hard disk drive. The processing units 126, 134 are arranged to cause the AAA server 103 and the AS 120, respectively to carry out at least one step of the respective method according to embodiments when the appropriate computer programs 127, 135 comprising computer-executable instructions are downloaded to the storage media 128, 136 and executed by the processing units 126, 134. The storage media 128, 136 may also be computer program products comprising the computer programs 127, 135. Alternatively, the computer programs 127, 135 may be transferred to the storage media 128, 136 by means of a suitable computer program product, such as a Digital Versatile Disc (DVD) or a memory stick. As a further alternative, the computer programs 127, 135 may be downloaded to the storage media 128, 136 over a network. The respective processing unit 126, 134 may alternatively be embodied in the form of a digital signal processor (DSP), an application specific integrated circuit (ASIC), a field-programmable gate array (FPGA), a complex programmable logic device (CPLD), etc.

It should be noted that the methods according to the above described embodiments are exemplified as being performed by a single AAA server 103 and AS 120, respectively, but could be performed by a number of different nodes/devices, where the steps performed are distributed over the different nodes/devices.

Figure 7:
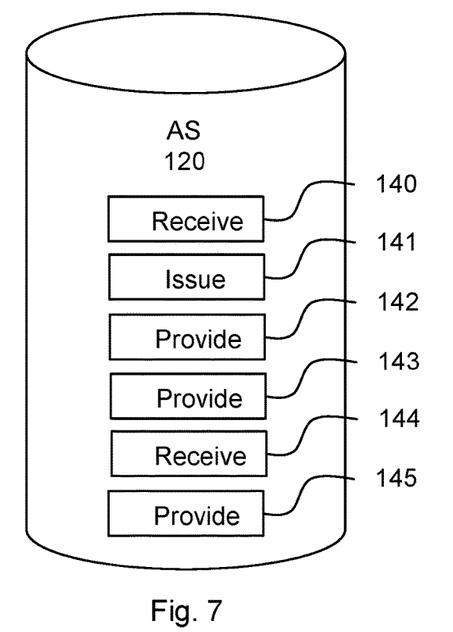
FIG. 7 illustrates an AS according to another embodiment.

FIG. 7 illustrates an AS 120 according to an embodiment configured to register a non-SIM mobile terminal with a wireless network. The AS 120 comprises receiving means 140 adapted to receive a request for registration of the non-SIM mobile terminal, the non-SIM mobile terminal being associated with a trusted SIM mobile terminal by means of an identifier of the non-SIM mobile terminal, issuing means 141 adapted to issue a vIMEI for the non-SIM mobile terminal, providing means 142 adapted to provide an EIR with the vIMEI, and providing means 143 adapted to provide a certificate issuing entity in the network with the vIMEI. The AS 120 further comprises receiving means 144 adapted to receive, from the certificate issuing entity, a certificate issued based on the vIMEI, and providing means 145 adapted to provide the non-SIM mobile terminal with the issued certificate. The means 140-145 may comprise a communications interface for receiving and providing information, and further a local storage for storing data, and may (in analogy with the description given in connection to FIG. 6) be implemented by a processor embodied in the form of one or more microprocessors arranged to execute a computer program downloaded to a suitable storage medium associated with the microprocessor, such as a RAM, a Flash memory or a hard disk drive.

Figure 8:
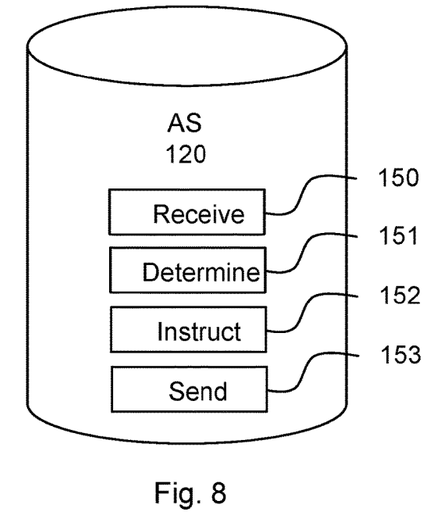
FIG. 8 illustrates an AS according to yet another embodiment.

FIG. 8 illustrates an AS 120 according to another embodiment configured to invalidate a non-SIM mobile terminal registered with a wireless network. The AS 120 comprises receiving means 150 adapted to receive a request of a trusted mobile terminal to invalidate a registration of a non-SIM mobile terminal being associated with the trusted mobile terminal by means of an identifier of the non-SIM mobile terminal to be invalidated, determining means 151 adapted to determine whether the association between the trusted mobile terminal and the non-SIM mobile terminal to be invalidated previously has been registered with the network, instructing means 152 adapted to instruct an EIR that a vIMEI registered for the non-SIM mobile terminal in the network should be invalidated, and sending means 153 adapted to send a response to the trusted mobile terminal that the registration of the non-SIM mobile terminal with the network has been invalidated. The means 150-153 may comprise a communications interface for receiving and providing information, and further a local storage for storing data, and may (in analogy with the description given in connection to FIG. 6) be implemented by a processor embodied in the form of one or more microprocessors arranged to execute a computer program downloaded to a suitable storage medium associated with the microprocessor, such as a RAM, a Flash memory or a hard disk drive.

Figure 9:
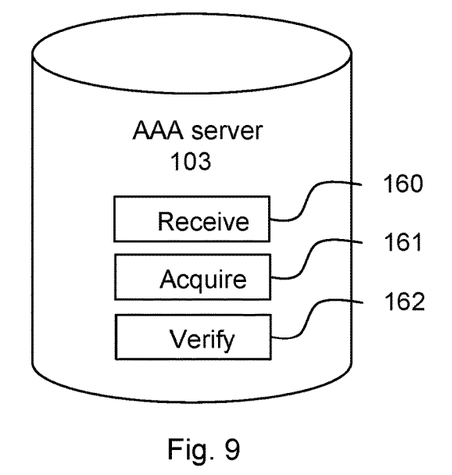
FIG. 9 illustrates an AAA server according to another embodiment.

FIG. 9 illustrates an AAA server 103 according to an embodiment configured to verify identity of a non-SIM mobile terminal registered with a wireless network. The AAA server 103 comprises receiving means 160 adapted to receive a request for service of the non-SIM mobile terminal, acquiring means 161 adapted to acquire a certificate of the non-SIM mobile terminal, and verifying means 162 adapted to verify that a vIMEI included in the certificate is registered with an EIR, wherein the identity of the non-SIM mobile terminal is considered verified. The means 160-162 may comprise a communications interface for receiving and providing information, and further a local storage for storing data, and may (in analogy with the description given in connection to FIG. 6) be implemented by a processor embodied in the form of one or more microprocessors arranged to execute a computer program downloaded to a suitable storage medium associated with the microprocessor, such as a RAM, a Flash memory or a hard disk drive.

The disclosure has mainly been described above with reference to a few embodiments. However, as is readily appreciated by a person skilled in the art, other embodiments than the ones disclosed above are equally possible within the scope of the disclosure, as defined by the appended patent claims.

What is claimed is:

1. A method performed by an Application Server, AS, of registering a non-Subscriber Identity Module, non-SIM, mobile terminal with a wireless network, the method comprising:

receiving, from a trusted SIM mobile terminal, an identifier of the non-SIM mobile terminal as an indication that the trusted SIM mobile terminal is associated with the non-SIM mobile terminal;

receiving a request for registration of the non-SIM mobile terminal from the non-SIM mobile terminal after receiving the identifier of the non-SIM mobile terminal, the non-SIM mobile terminal being associated with the trusted SIM mobile terminal by means of the identifier of the non-SIM mobile terminal, the trusted SIM mobile terminal being registered with the wireless network and the identifier having been provided by the SIM mobile terminal;

responsive to receiving the request for registration of the non-SIM mobile terminal, issuing a virtual International Mobile Station Equipment Identity, vIMEI, for the non-SIM mobile terminal, the vIMEI being based on the identifier of the non-SIM mobile terminal;

providing an Equipment Identity Register, EIR, with the vIMEI;

providing a certificate issuing entity in the network with the vIMEI;

receiving, from the certificate issuing entity, a certificate issued based on the vIMEI; and providing the non-SIM mobile terminal with the issued certificate.

2. The method of claim 1, wherein providing the EIR with the vIMEI comprises:

verifying that the vIMEI has not previously been registered with the EIR or that the vIMEI has not been registered as blacklisted.

3. The method of claim 1, further comprising:

responsive to providing the non-SIM mobile terminal with the issued certificate, receiving a request for registration of a further non-SIM mobile terminal from the further non-SIM mobile terminal, the further non-SIM mobile terminal being associated with the non- SIM terminal for which the certificate was issued by means of an identifier of the further non-SIM mobile terminal;

responsive to receiving the request for registration of the further non-SIM mobile terminal, issuing a virtual International Mobile Station Equipment Identity, vIMEI, for the further non-SIM mobile terminal the vIMEI being based on the identifier of the further non-SIM mobile terminal;

providing the EIR with the vIMEI of the further non-SIM mobile terminal;

providing the certificate issuing entity in the network with the vIMEI of the further non-SIM mobile terminal;

receiving, from the certificate issuing entity, a certificate issued based on the vIMEI of the further non-SIM mobile terminal; and providing the further non-SIM mobile terminal with the issued certificate.

4. The method of claim 1, further comprising:

responsive to providing the non-SIM mobile terminal with the issued certificate, determining that the non-SIM mobile terminal is a trusted mobile terminal registered with the wireless network; and responsive to determining that the non-SIM mobile terminal is a trusted mobile terminal, receiving from the non-SIM mobile terminal the identifier of the further non-SIM mobile terminal as an indication that the non-SIM mobile terminal is associated with the further non-SIM mobile terminal.

5. An application Server, AS, configured to register a non-Subscriber Identity Module, non-SIM, mobile terminal with a wireless network, the AS comprising:

a processing unit; and a memory, the memory having instructions stored therein that are executable by the processing unit to cause the processing unit to:

receive, from a trusted SIM mobile terminal, an identifier of the non-SIM mobile terminal as an indication that the trusted SIM mobile terminal is associated with the non-SIM mobile terminal;

receive a request for registration of the non-SIM mobile terminal from the non-SIM mobile terminal after receiving the identifier of the non-SIM mobile terminal, the non-SIM mobile terminal being associated with the trusted SIM mobile terminal by means of the identifier of the non-SIM mobile terminal, the trusted SIM mobile terminal being registered with the wireless network and the identifier having been provided by the SIM mobile terminal;

responsive to receiving the request for registration of the non-SIM mobile terminal, issue a virtual International Mobile Station Equipment Identity, vIMEI, for the non-SIM mobile terminal, the vIMEI being based on the identifier of the non-SIM mobile terminal;

provide an Equipment Identity Register, EIR, with the vIMEI;

provide a certificate issuing entity in the network with the vIMEI;

receive, from the certificate issuing entity, a certificate issued based on the vIMEI; and provide the non-SIM mobile terminal with the issued certificate.

6. The AS of claim 5, wherein the instructions executable by the processing unit for causing the processing unit to provide the EIR with the vIMEI comprises causing the processing unit to:

verify that the vIMEI has not previously been registered with the EIR or that the vIMEI has not been registered as blacklisted.

7. The AS of claim 5, wherein further instructions are stored on the memory that are executable by the processing unit for causing the processing unit to:

responsive to providing the non-SIM mobile terminal with the issued certificate, receive a request for registration of a further non-SIM mobile terminal from the further non-SIM mobile terminal, the further non-SIM mobile terminal being associated with the non-SIM terminal for which the certificate was issued by means of an identifier of the further non-SIM mobile terminal;

responsive to receiving the request for registration of the further non-SIM mobile terminal, issue a virtual International Mobile Station Equipment Identity, vIMEI, for the further non-SIM mobile terminal the vIMEI being based on the identifier of the further non-SIM mobile terminal;

provide the EIR with the vIMEI of the further non-SIM mobile terminal;

provide the certificate issuing entity in the network with the vIMEI of the further non-SIM mobile terminal;

receive, from the certificate issuing entity, a certificate issued based on the vIMEI of the further non-SIM mobile terminal; and provide the further non-SIM mobile terminal with the issued certificate.

8. The AS of claim 5, wherein the instructions are further executable by the processing unit for causing the processing unit to:

responsive to providing the non-SIM mobile terminal with the issued certificate, determine that the non-SIM mobile terminal is a trusted mobile terminal registered with the wireless network; and responsive to determining that the non-SIM mobile terminal is a trusted mobile terminal, receive from the non-SIM mobile terminal the identifier of the further non-SIM mobile terminal as an indication that the non-SIM mobile terminal is associated with the further non-SIM mobile terminal.

9. A method performed by an Application Server, AS, of registering a non-Subscriber Identity Module, non-SIM, mobile terminal with a wireless network, the method comprising:

receiving a request for registration of the non-SIM mobile terminal from the non-SIM mobile terminal, the non-SIM mobile terminal being associated with a trusted SIM mobile terminal by means of an identifier of the non-SIM mobile terminal, the trusted SIM mobile terminal being registered with the wireless network and the identifier having been provided by the SIM mobile terminal;

responsive to receiving the request for registration of the non-SIM mobile terminal, issuing a virtual International Mobile Station Equipment Identity, vIMEI, for the non-SIM mobile terminal, the vIMEI being based on the identifier of the non-SIM mobile terminal;

providing an Equipment Identity Register, EIR, with the vIMEI;

providing a certificate issuing entity in the network with the vIMEI;

receiving, from the certificate issuing entity, a certificate issued based on the vIMEI;

providing the non-SIM mobile terminal with the issued certificate;

responsive to providing the non-SIM mobile terminal with the issued certificate, determining that the non-SIM mobile terminal is a trusted mobile terminal registered with the wireless network; and responsive to determining that the non-SIM mobile terminal is a trusted mobile terminal, receiving from the non-SIM mobile terminal the identifier of the further non-SIM mobile terminal as an indication that the non-SIM mobile terminal is associated with the further non-SIM mobile terminal.

10. The method of claim 9, wherein providing the EIR with the vIMEI comprises:

verifying that the vIMEI has not previously been registered with the EIR or that the vIMEI has not been registered as blacklisted.

11. The method of claim 9, further comprising:

responsive to providing the non-SIM mobile terminal with the issued certificate, receiving a request for registration of a further non-SIM mobile terminal from the further non-SIM mobile terminal, the further non-SIM mobile terminal being associated with the non-SIM terminal for which the certificate was issued by means of an identifier of the further non-SIM mobile terminal;

responsive to receiving the request for registration of the further non-SIM mobile terminal, issuing a virtual International Mobile Station Equipment Identity, vIMEI, for the further non-SIM mobile terminal the vIMEI being based on the identifier of the further non-SIM mobile terminal;

providing the EIR with the vIMEI of the further non-SIM mobile terminal;

providing the certificate issuing entity in the network with the vIMEI of the further non-SIM mobile terminal;

receiving, from the certificate issuing entity, a certificate issued based on the vIMEI of the further non-SIM mobile terminal; and providing the further non-SIM mobile terminal with the issued certificate.

12. The method of claim 9, further comprising:

receiving, from the trusted SIM mobile terminal and prior to receiving the request for registration of the non-SIM mobile terminal, the identifier of the non-SIM mobile terminal as an indication that the SIM mobile terminal is associated with the non-SIM mobile terminal.

* * * * *